United States Patent
Vie et al.

(10) Patent No.: US 9,830,887 B2
(45) Date of Patent: *Nov. 28, 2017

(54) HVAC CONTROLS AND CONTROLLERS INCLUDING ALPHANUMERIC DISPLAYS

(71) Applicant: Emerson Electric Co., St. Louis, MO (US)

(72) Inventors: David L. Vie, Union, MO (US);
Michael J. Moran, St. Louis, MO (US); John J. Heller, St. Louis, MO (US)

(73) Assignee: Emerson Electric Co., St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/230,723

(22) Filed: Aug. 8, 2016

(65) Prior Publication Data
US 2016/0343353 A1  Nov. 24, 2016

Related U.S. Application Data

(63) Continuation of application No. 14/156,338, filed on Jan. 15, 2014, now Pat. No. 9,412,328.
(Continued)

(51) Int. Cl.
*G09G 5/32* (2006.01)
*G06F 3/0484* (2013.01)
(Continued)

(52) U.S. Cl.
CPC .............. *G09G 5/32* (2013.01); *B60H 1/0065* (2013.01); *B60H 1/00985* (2013.01); *B60K 37/06* (2013.01); *F24F 11/0086* (2013.01);
*G06F 1/162* (2013.01); *G06F 3/04845* (2013.01); *G06F 3/04897* (2013.01); *G06F 3/14* (2013.01); *G09G 5/00* (2013.01);
(Continued)

(58) Field of Classification Search
CPC .............. G09G 5/32; G09G 2340/0492; G06F 3/04845; B60H 1/00985; G06T 3/60
See application file for complete search history.

(56) References Cited

U.S. PATENT DOCUMENTS 4,163,129 A  7/1979 Rossi et al.
4,266,405 A  5/1981 Trask
(Continued)

FOREIGN PATENT DOCUMENTS

EP  1926075 B1  1/2013

OTHER PUBLICATIONS

"47D40-801 Demand Frost Control Installation Instructions"; www.emersonclimate.com; accessed Jan. 22, 2014; 3 pgs.
(Continued)

*Primary Examiner* — Jeffery A Brier
(74) *Attorney, Agent, or Firm* — Harness, Dickey & Pierce, P.L.C.

(57) ABSTRACT

Disclosed are exemplary embodiments of controls for heating, ventilation, and/or air conditioning systems. In an exemplary embodiment, a control for a heating, ventilation, and/or air conditioning system includes an alphanumeric display and one or more input device. A processor of the control is configured to receive a user input through the input device(s), and in response to the user input, reorient a display of a message relative to the alphanumeric display.

14 Claims, 6 Drawing Sheets

Related U.S. Application Data

(60) Provisional application No. 61/920,952, filed on Dec. 26, 2013.

(51) Int. Cl.

| | | |
|---|---|---|
| *B60H 1/00* | (2006.01) | |
| *G06F 3/14* | (2006.01) | |
| *G09G 5/00* | (2006.01) | |
| *G06F 1/16* | (2006.01) | |
| *B60K 37/06* | (2006.01) | |
| *F24F 11/00* | (2006.01) | |
| *G06F 3/0489* | (2013.01) | |
| *G06F 3/0482* | (2013.01) | |

(52) U.S. Cl.
CPC ..... *F24F 2011/0091* (2013.01); *G06F 3/0482* (2013.01); *G06F 3/04847* (2013.01); *G09G 2340/0492* (2013.01); *Y02B 30/762* (2013.01)

(56) References Cited

U.S. PATENT DOCUMENTS

| | | |
|---|---|---|
| 4,318,425 A | 3/1982 | Marks |
| 4,346,564 A | 8/1982 | Gemma et al. |
| 4,510,765 A | 4/1985 | Rossi |
| 4,538,420 A | 9/1985 | Nelson |
| 4,653,285 A | 3/1987 | Pohl |
| 4,724,678 A | 2/1988 | Pohl |
| 4,881,057 A | 11/1989 | Garcia et al. |
| 4,882,908 A | 11/1989 | White |
| 5,043,692 A | 8/1991 | Sites et al. |
| 5,237,830 A | 8/1993 | Grant |
| 5,388,421 A | 2/1995 | Matsuoka |
| 5,454,641 A | 10/1995 | Parker et al. |
| 5,497,941 A | 3/1996 | Numazawa et al. |
| 5,507,154 A | 4/1996 | Grant |
| 5,661,632 A | 8/1997 | Register |
| 5,686,831 A | 11/1997 | Vandervalk |
| 5,692,385 A | 12/1997 | Hollenbeck et al. |
| 5,707,151 A | 1/1998 | Park et al. |
| 5,872,721 A | 2/1999 | Huston et al. |
| 5,910,882 A | 6/1999 | Burrell |
| 6,207,967 B1 | 3/2001 | Hochstein |
| 6,622,503 B1 | 9/2003 | Bennett et al. |
| 6,951,306 B2 | 10/2005 | DeLuca |
| 7,020,543 B1 | 3/2006 | Jaeschke et al. |
| 7,152,806 B1 | 12/2006 | Rosen |
| 7,245,475 B2 | 7/2007 | Huber et al. |
| 7,296,426 B2 | 11/2007 | Butler et al. |
| 7,614,567 B2 | 11/2009 | Chapman, Jr. et al. |
| 7,664,575 B2 | 2/2010 | Boydstun et al. |
| 7,784,291 B2 | 8/2010 | Butler et al. |
| 7,999,789 B2 | 8/2011 | Ha et al. |
| 8,078,326 B2 | 12/2011 | Harrod et al. |
| 8,389,916 B2 | 3/2013 | Ben-Shmuel et al. |
| 9,412,328 B2 * | 8/2016 | Vie ............................ G06F 3/14 |
| 2003/0122781 A1 | 7/2003 | Koo |
| 2004/0098571 A1 | 5/2004 | Falcon |
| 2004/0217182 A1 | 11/2004 | St. Jean et al. |
| 2004/0220777 A1 | 11/2004 | St. Jean et al. |
| 2004/0230402 A1 | 11/2004 | St. Jean |
| 2007/0012052 A1 | 1/2007 | Butler et al. |
| 2008/0073440 A1 | 3/2008 | Butler et al. |
| 2009/0115689 A1 | 5/2009 | Mitsutake |
| 2010/0163377 A1 | 7/2010 | Frassineti et al. |
| 2010/0318266 A1 | 12/2010 | Schaaf |
| 2015/0187050 A1 | 7/2015 | Vie et al. |

OTHER PUBLICATIONS

"47D43-811 Delixe Defrost Control Installation Instructions"; www.emersonclimate.com; accessed Jan. 22, 2014; 3 pgs.

http://www.kehongled.com/English/Products/LEDDisplays.html; Accessed and printed Jun. 28, 2012.

http://kehongled.en.alibaba.com/productshowimg/265049411-210046929/16_segment_graphic_LED_Display.html; Accessed and printed Jun. 28, 2012.

"Multi-digit LED Seven Segment Display"; www.snowdragonledhk.com; © 2007-2013; printed Jul. 3, 2013, 2 pgs.

Emerson Climate Technologies web page for Universal Heat Pump Defrost Control 47D01U-843, downloaded from hhtp://www,emersonclimate.com/en-us/products/controls/residential-ac-heat-pump-controls/pages/defrost-control.aspx on Feb. 27, 2016.

Emerson Climate Technologies Specification Sheet for Universal Heat Pump Defrost Control 47D01U-843 downloaded from hhtp://www.emersonclimate.com/Documents/White-Rodgers/sell_sheets/wr-4430-47D01U843-ss.pdf on Feb. 27, 2016.

Emerson Climate Technologies Installation Instructions for Universal Heat Pump Defrost Control 47D01U-843 downloaded from hhtp://www.emersonclimate.com/Documents/White-Rodgers/Instruction_sheets/0037-7526B.pdf on Feb. 27, 2016.

* cited by examiner

HVAC CONTROLS AND CONTROLLERS INCLUDING ALPHANUMERIC DISPLAYS

CROSS-REFERENCE TO RELATED APPLICATIONS

This application is a continuation of U.S. patent application Ser. No. 14/156,338 filed Jan. 15, 2014 which claims the benefit of U.S. Provisional Application No. 61/920,952, filed on Dec. 26, 2013. The entire disclosures of the above applications are incorporated herein by reference.

FIELD

The present disclosure relates to controls or controllers for heating, ventilation, and air conditioning (HVAC) systems, which include alphanumeric displays that may be used for selecting menu options, setting or adjusting operational parameters, recalling faults, etc.

BACKGROUND

This section provides background information related to the present disclosure which is not necessarily prior art.

The operational parameters of an HVAC appliance (e.g., furnace, aft conditioner, heat pump, etc.) may be set by using an HVAC control or controller. In setting the operational parameters, a contractor, installer, or original equipment manufacturer may refer to a display that indicates, e.g., status and fault information.

SUMMARY

This section provides a general summary of the disclosure, and is not a comprehensive disclosure of its full scope or all of its features.

Exemplary embodiments are disclosed of controls for heating, ventilation, and/or air conditioning systems. In an exemplary embodiment, a control for a heating, ventilation, and/or air conditioning system includes an alphanumeric display and one or more input device. A processor of the control is configured to receive a user input through the input device(s), and in response to the user input, reorient a display of a message relative to the alphanumeric display.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Example embodiments will now be described more fully with reference to the accompanying drawings.

The inventors hereof have recognized that indoor and outdoor HVAC controls are increasing in complexity and can provide increasing numbers of setup and diagnostic options. Small segmented displays are sometimes implemented to assist in the readability of such options. A display can be difficult to read when the orientation of equipment holding the display is changed. For example, many furnaces can be installed up-flow, down-flow, or horizontally and may be field-convertible. Accordingly, the inventors have developed and disclose herein exemplary embodiments of controls for heating, ventilation, and/or air conditioning (HVAC) systems. In various aspects, such controls may include alphanumeric display configurations, e.g., dot matrix displays, multiple-segment displays such as three seven-segment displays, three sixteen-segment displays, etc. Such a control also may have one or more input devices including but not limited to one or more two-position switches, e.g., push buttons, two position slide switch, dip switches, momentary switches, etc. In such a control, a processor may receive user input through the input device(s), and in response to the user input, re-orient a display of a message relative to the alphanumeric display.

Exemplary embodiments are disclosed herein of control boards for controllers or controls, which may be used with furnace controls (e.g., integrated furnace control (IFC), etc.), air handler controls, unitary controls, heat pump controls, among other possible controls or controllers for residential HVAC or commercial HVAC. In some exemplary embodiments, a control includes an alphanumeric display configuration having a plurality of multiple-segment displays (e.g., light-emitting diode (LED) seven-segment displays, LED sixteen-segment displays, etc.) and a keypad with push buttons (e.g., two or more momentary push buttons, etc.) In one exemplary embodiment, the push buttons are an exemplary type of two-position switch where a default position is a spring return, and the other position requires the user to depress the button or switch to overcome the spring. Alternative embodiments may use other two-position switches instead of, or in addition to push buttons, such as one or more of a two-position slide switch, dip switch, etc.

An LED display and keypad of a control or controller may be used for selecting a menu and then setting or adjusting an operational parameter for the selected menu. Additionally or alternatively, a LED display and keypad of a control or controller may be used for recalling a fault. Example embodiments of such controls and controllers are described in co-pending U.S. application Ser. No. 13/535,396, filed Jun. 28, 2012 and assigned to the assignee hereof, the disclosure of which is incorporated herein by reference in its entirety.

Figure 1:
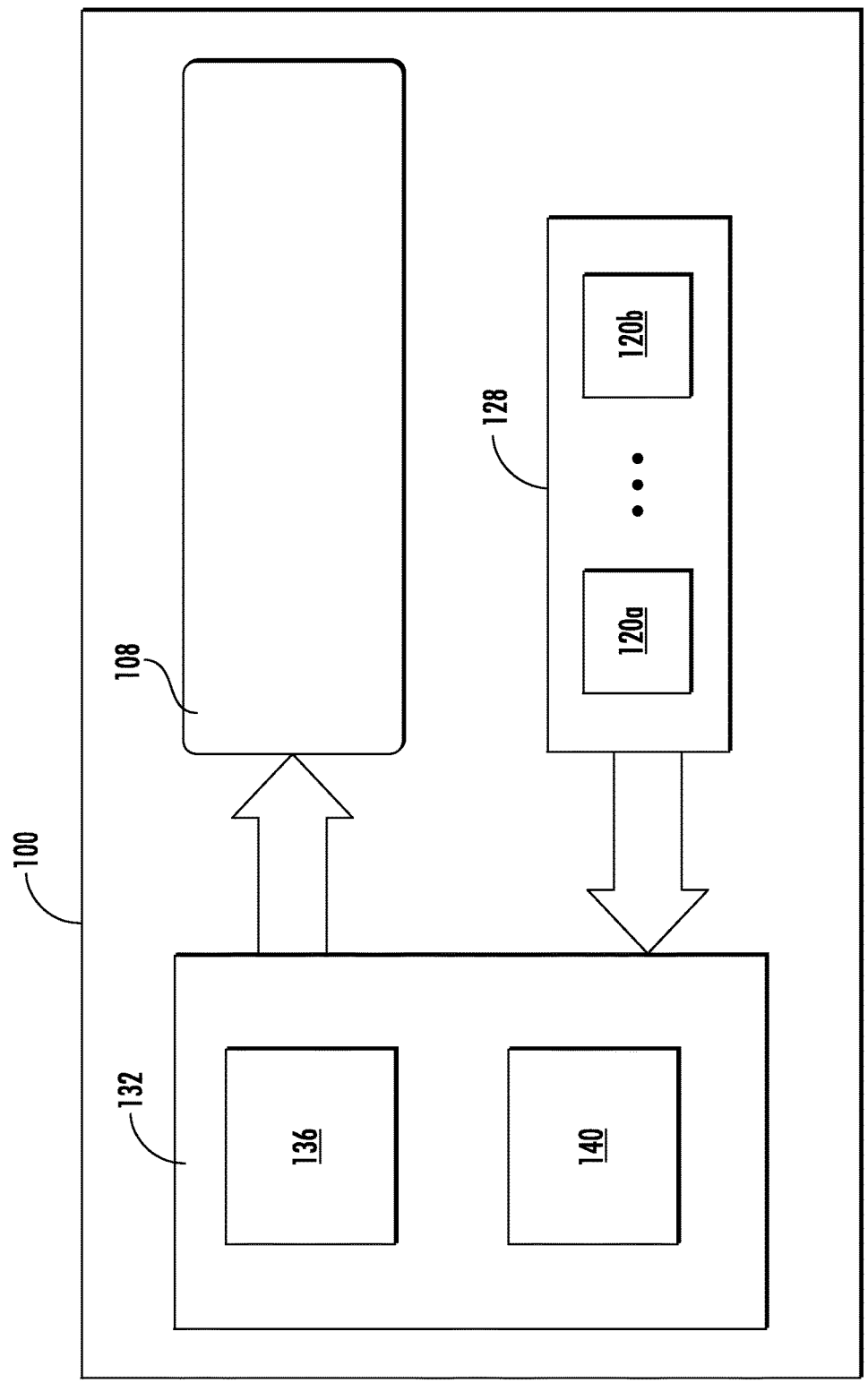
FIG. 1 is a block diagram of an exemplary embodiment of a control or controller including a microprocessor or micro-controller coupled with a key pad and an alphanumeric display.

With reference now to the figures, FIG. 1 is a diagram of an example control 100 for a heating, ventilation, and/or air conditioning system. The control 100 includes an alphanumeric display 108. In various embodiments, the alphanumeric display 108 may include light-emitting diode (LED) seven-segment displays, one or more dot matrix displays, multiple-segment displays having more than or fewer than seven segments, etc. In one exemplary embodiment, an alphanumeric display includes three (3) light-emitting diode (LED) sixteen-segment displays. In another exemplary embodiment, an alphanumeric display includes a LED dot matrix display having, e.g., sixty-four (64) LED indicators.

The control 100 also has a plurality of keys or push buttons, e.g., momentary push buttons 120a and 120b provided on a keypad 128. Although two push buttons (120a, 120b) are shown in FIG. 1, more than two push buttons may be provided in alternative embodiments. In addition, alternative embodiments may use other two-position switches instead of, or in addition to push buttons, such as one or more of a two-position slide switch, dip switch, etc. For example, another exemplary embodiment includes two-position slide switches and an alphanumeric display having a plurality of light-emitting diode (LED) seven-segment and/or sixteen-segment displays.

A microcontroller 132 includes a processor 136 configured to receive a user input through at least one of the push buttons (120a, 120b) and to determine how to respond to the user input. To determine a response, the processor 136 may use one or more user inputs, if any, previously received via the push button(s) (120a, 120b). Example embodiments of controls and controllers that utilize previously received user inputs are described in co-pending U.S. application Ser. No. 13/535,396, filed Jun. 28, 2012 and assigned to the assignee hereof. To implement the determined response, the processor 136 may, e.g., display a message on the alphanumeric display 108. The microcontroller 132 also includes memory 140 in which, e.g., operational parameters may be stored and changed in response to user input via the push buttons (120a, 120b).

In various embodiments, a control may use an alphanumeric display and one or more input devices such as two-position switches (e.g., push buttons, etc.) to display and present user options as to various system conditions, modes, and operating parameters. For example, in some embodiments, two-position switches can be used to invert or otherwise reposition the orientation of output on an alphanumeric display so that the output is in a preferred orientation for the user. An example control for use in a heating, ventilation, and/or air conditioning system is indicated generally in FIG. 2 by reference number 500. The control 500 includes an alphanumeric display 508. In the present example embodiment, the alphanumeric display 508 includes three (3) light-emitting diode (LED) seven-segment displays 512. In various aspects, an alphanumeric display may include one or more dot matrix displays, one or more multiple-segment displays having more than or fewer than seven segments, etc. For example, another exemplary embodiment includes an alphanumeric display having three (3) light-emitting diode (LED) sixteen-segment displays.

The control 500 receives input(s) 528, e.g., via key(s), two-position switch(es) such as push button(s), slide switches, DIP switch(es), jumper(s), etc. Input(s) 528 to the control 500 may additionally or alternatively be provided by command from, e.g., a thermostat or other controller or control, by serial command, etc. A microcontroller 532 includes a processor 536 configured to respond to the input(s) 528. To implement a determined response, the processor 536 may, e.g., cause a message to be displayed on the alphanumeric display 508. The microcontroller 532 also includes memory 540 in which, e.g., programmed instructions and/or operational parameters may be stored and changed, e.g., in response to input(s) 528. In various embodiments, the control 500 includes one or more printed circuit boards (PCBs) (not shown) on which some or all of the above components are provided.

In the present example embodiment, the processor 536 is configured to provide a message of up to three characters as binary data to one or more decoders 550. The decoder(s) 550 activate appropriate segments 554 of the seven-segment displays 512 in accordance with the binary data to display the characters. In some embodiments, a single decoder 550 may be used to decode data for more than one, e.g., all, of the seven-segment displays 512. In some other embodiments each seven-segment display 512 may have its own decoder 550. A single decoder 550 is shown in the example control of FIG. 2. In some embodiments the decoder 550 may be or include an integrated circuit (IC).

Figure 2:
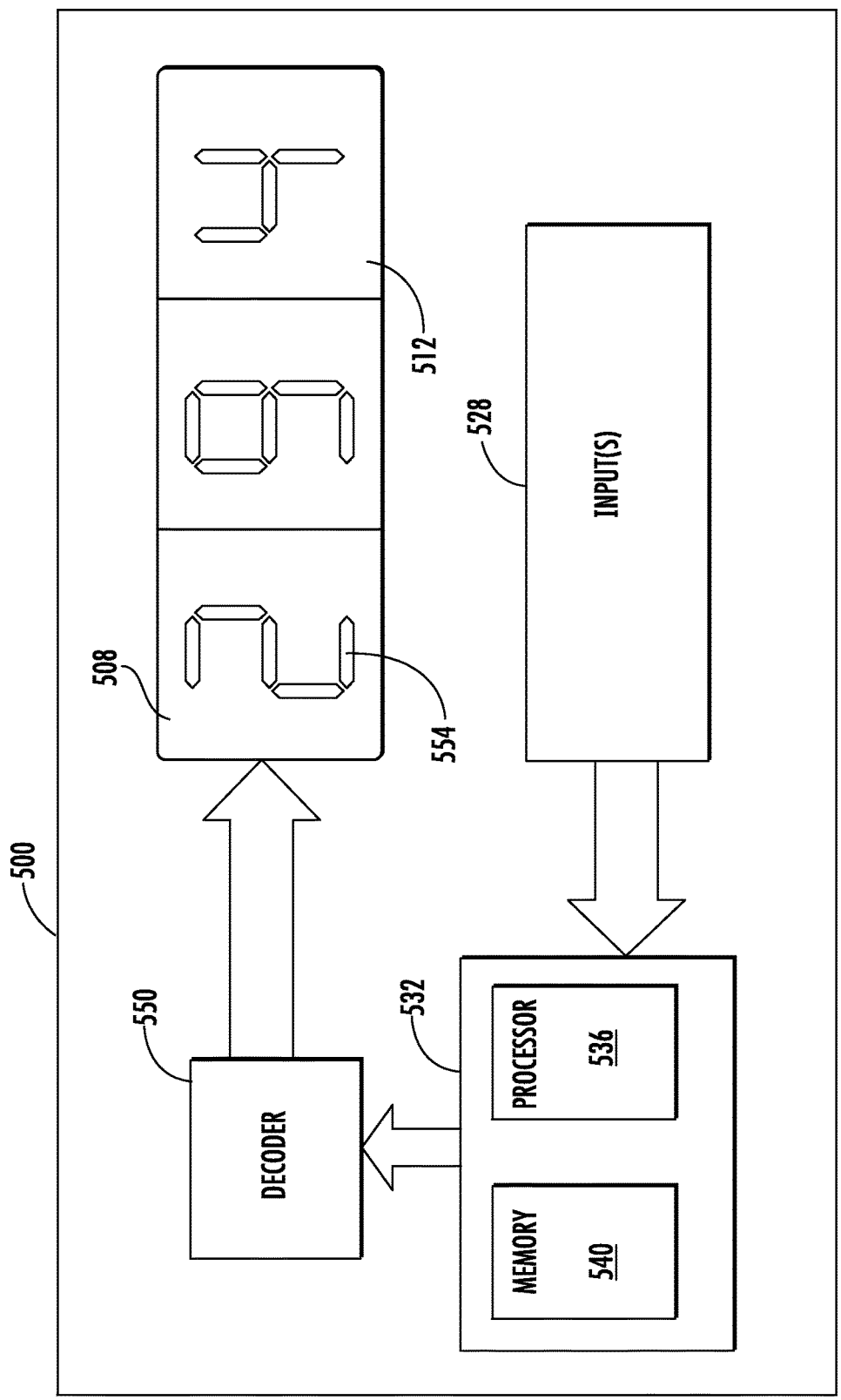
FIG. 2 is a is a block diagram of an exemplary embodiment of a control or controller including a microprocessor or micro-controller coupled with one or more input devices and an alphanumeric display.

In the example shown in FIG. 2, the seven-segment displays 512 together display a message of three characters, e.g., the number "294". It can be seen that if, e.g., a user were to turn by 180 degrees a piece of equipment in or on which the alphanumeric display 508 is provided, the three displays 512 together would appear to display the message "h62" instead of "294". Thus in various embodiments, the processor 536 may execute instructions, e.g., stored in the memory 540, to reorient a message for display.

Figure 3:
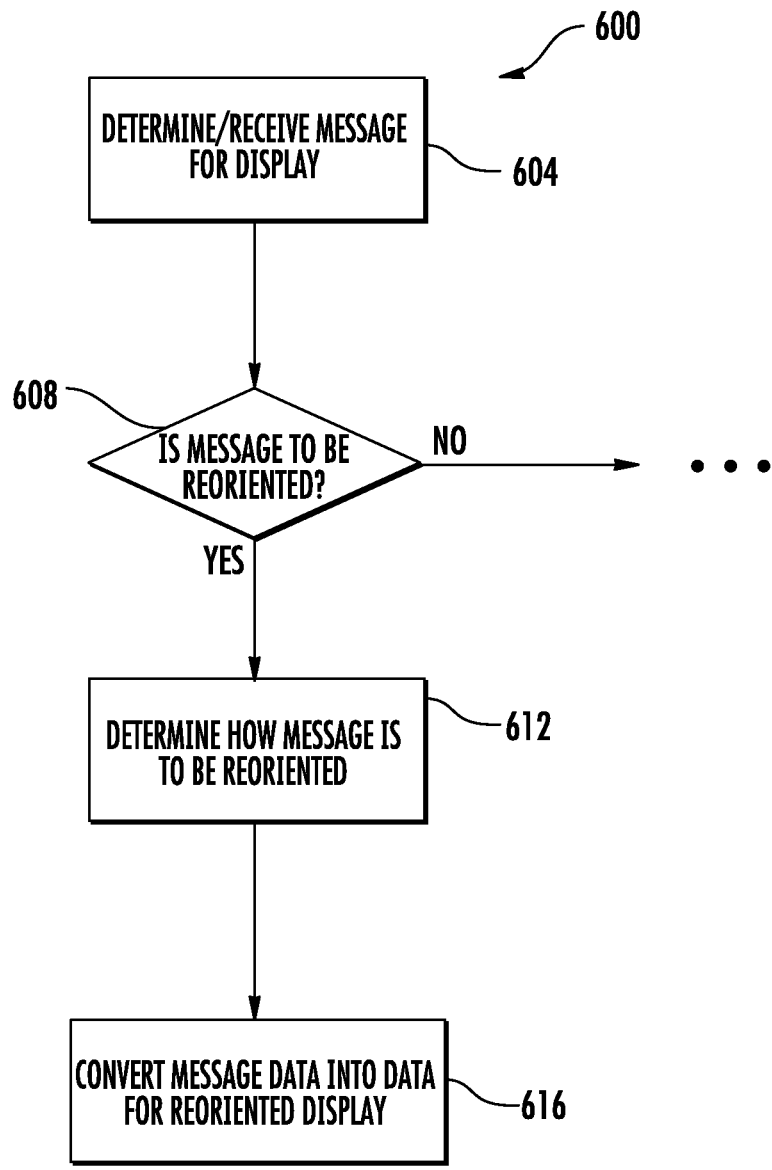
FIG. 3 is a flow diagram of an exemplary embodiment of an operational sequence for reorienting a message.

In some implementations the processor 536 may execute an example method indicated generally in FIG. 3 by reference number 600. In process 604 the processor 536 determines or receives a message to be displayed. In process 608 the processor 536 determines whether the message is to be reoriented. The determination to reorient may be made in response, e.g., to input received via input(s) 528, which may be input(s) from other HVAC controls or controllers, HVAC equipment position sensor(s), etc. Thus a display may be reoriented in response to input from sources other than or in addition to two-position switches. One or more DIP switch, jumper, thermostat command, serial command and/or other means could be used to indicate to a processor that a message for display on an alphanumeric display is to be inverted or otherwise repositioned, e.g., to a preferred viewing orientation.

Referring again to the example method of FIG. 3, the processor in process 612 determines how the message is to be reoriented. For example, for seven-segment displays such as those of the alphanumeric display 508, reorientation would most commonly include turning the message upside down, i.e., rotating the message by 180 degrees. Other or additional types of reorientation could be used, however, in relation to segmented displays for messages formatted in characters that would maintain their meaning when rotated by more or less than 180 degrees. For example, a character to be displayed on a sixteen-segment display can be rotated, e.g., by 90, 180 or 270 degrees and maintain its original meaning when displayed. Further, in example embodiments in which a dot matrix display is provided as discussed below, a message may retain its meaning when rotated, e.g., by 90 degrees, 180 degrees, and/or 270 degrees. Additionally or alternatively, in some embodiments a processor may change the formatting of a character so as to preserve the character's meaning when the message is reoriented. For example, where a letter "C" is to be displayed as a capital letter on a seven-segment display 512 in a first orientation of the display, the letter "c" could be reformatted for display as a small letter "c" in orientations of the same seven-segment display 512 at 90, 180, and/or 270 degrees.

In various embodiments a reorientation of an alphanumeric display may be provided as a default orientation via hardware and/or software. For example, in some embodiments in which a piece of equipment carrying the alphanumeric display 508 is installed such that the example alphanumeric display 508 is installed upside down, a jumper may be configured so as to indicate to the processor 536 that each message destined for display on the alphanumeric display 508 is to be rotated by 180 degrees or by some other angle. In some embodiments, the processor 536 may be reprogrammed to automatically reorient each message for display. Additionally or alternatively, embodiments may be provided in which a user may use input(s) 528 to instruct the processor 536 to reorient a message. For example, a user may be provided with one or more menu items, e.g., as further described below, allowing the user to select a particular type of message reorientation.

Referring again to FIG. 3 and the example control 500, to reorient a message for display on the alphanumeric display 508, the processor 536 in process 616 converts binary data representing the message as currently oriented into binary data for activating the display segments 554 to represent the message in the selected reorientation. In general, conversion of message data may be accomplished in various control embodiments through hardware, software, firmware, combinations of the foregoing, etc. In some embodiments the processor 536 may use lookup tables stored in the memory 540 to obtain the conversion. The processor 536 outputs the converted data to the decoder 550, which signals the alphanumeric display 508 to display those segments 554 that represent the message in a reoriented form.

Figure 4:
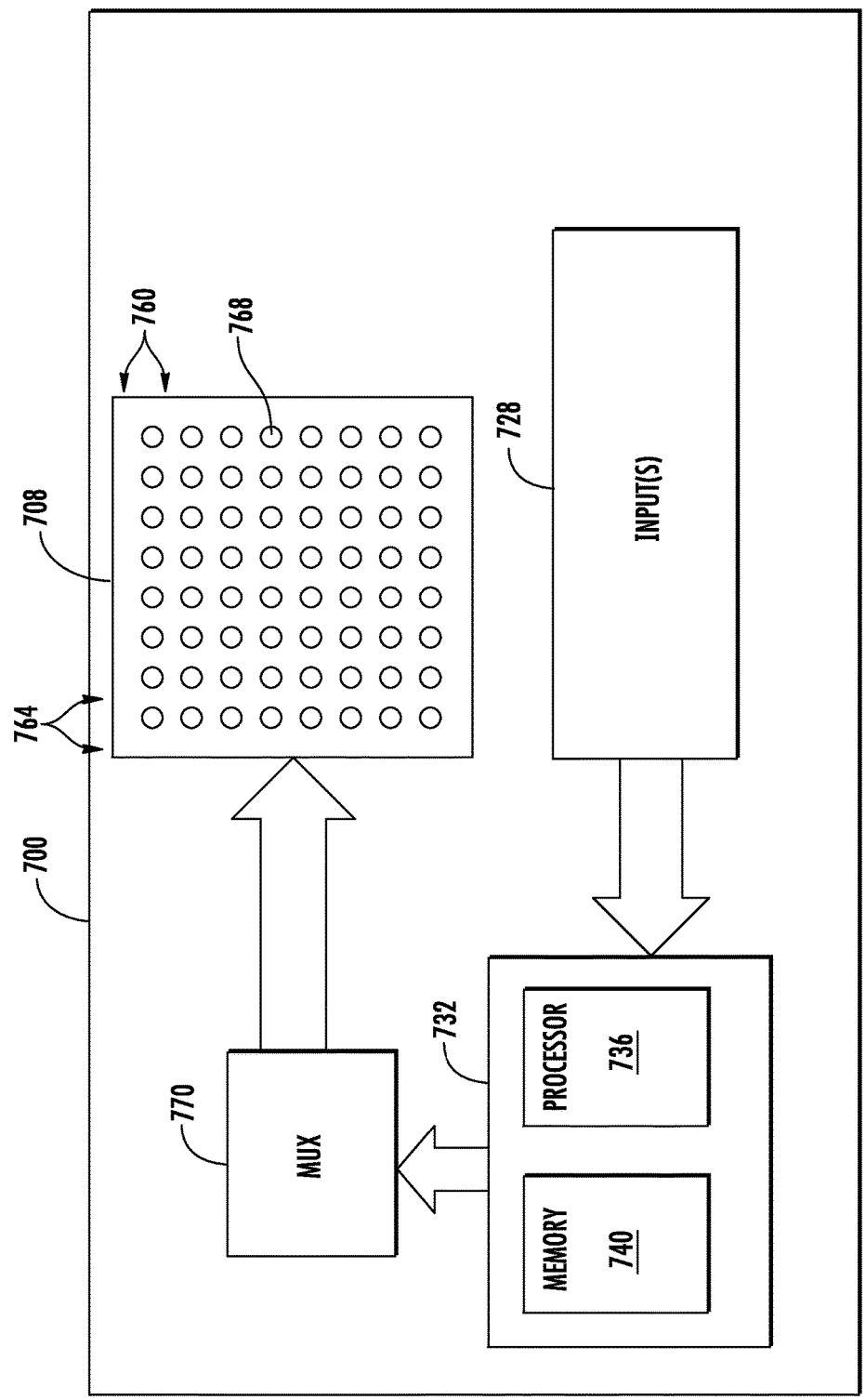
FIG. 4 is a is a block diagram of an exemplary embodiment of a control or controller including a microprocessor or micro-controller coupled with one or more input devices and an alphanumeric display.
Figure 5:
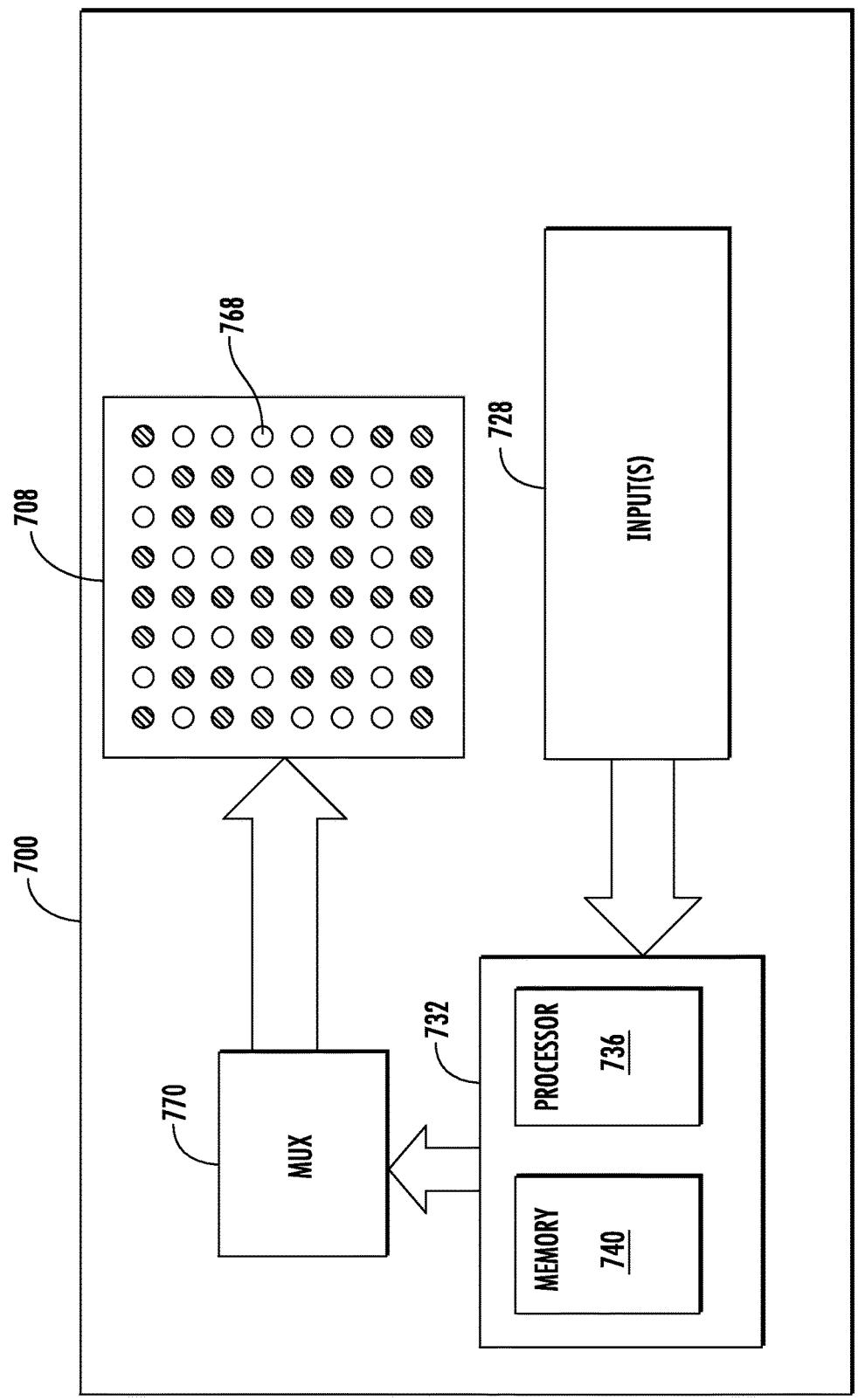
FIG. 5 is a is a block diagram of an exemplary embodiment of a control or controller including a microprocessor or micro-controller coupled with one or more input devices and an alphanumeric display.

Additionally or alternatively, embodiments are possible, e.g., in relation to dot matrix displays. Another example control for use in a heating, ventilation, and/or air conditioning system is indicated generally in FIGS. 4 and 5 by reference number 700. The control 700 includes an alphanumeric display 708. In the present example embodiment, the alphanumeric display 708 is a LED dot matrix display having eight rows 760 and eight columns 764 of LED indicators 768. In various aspects, other or additional types of matrix displays could be used, including but not limited to LCD dot matrix displays, matrix displays having more or fewer than sixty-four indicators, non-square matrix displays, etc.

The control 700 receives input(s) 728, e.g., via key(s), two-position switch(es) such as push button(s), slide switches, DIP switch(es), jumper(s), etc. Input(s) 728 to the control 700 may additionally or alternatively be provided by command from, e.g., a thermostat or other controller or control, by serial command, etc. A microcontroller 732 includes a processor 736 configured to respond to the input(s) 728. To implement a determined response, the processor 736 may, e.g., cause a message to be displayed on the alphanumeric display 708. The microcontroller 732 also includes memory 740 in which, e.g., programmed instructions and/or operational parameters may be stored and changed, e.g., in response to input(s) 728. In various embodiments, the control 700 includes one or more PCBs (not shown) on which some or all of the above components are provided.

In the present embodiment the processor 736 is configured to provide a message as binary data, e.g., through a multiplexer 770, to the alphanumeric display 708. Thus the control 700, e.g., in response to input, may generate output displaying individual dot patterns that can represent, e.g., symbols and/or characters. In various embodiments a multiplexer may or may not be provided and/or the processor 736 may or may not perform multiplexing. In the example shown in FIG. 5, the alphanumeric display 708 displays a message of two characters, e.g., the number "29". In various embodiments, the processor 736 may execute instructions, e.g., stored in the memory 740, to reorient a message for display. In the present example control 700, the processor 736 may convert binary data representing the message as currently oriented into binary data for activating the alphanumeric display 708 to represent the message in the selected reorientation. In various embodiments the processor 736 may use lookup tables stored in the memory 740 to obtain the conversion. The processor 736 outputs the converted data to the alphanumeric display 708 to display the message in a reoriented form. As previously mentioned, a message for display on a dot matrix display may retain its meaning when rotated, e.g., by 90 degrees, 180 degrees, and/or 270 degrees. In some embodiments it may be possible for a processor to change the formatting of characters in a message so as to preserve the message's meaning when the message is reoriented for display at angles other than right angles, e.g., at 45 degrees, etc.

In various embodiments, a user may select one or more menu items provided on an alphanumeric display to cause a message to be rotated on the display. For example, where a control receives input via one or more two-position switches, the user may activate the switch(es) to select rotation of a message and/or to select a particular angle of message rotation. Additionally or alternatively, the user may activate the switch(es) to select whether a particular type of message reorientation is to be applied automatically as a default to message(s) for display.

Figure 6:
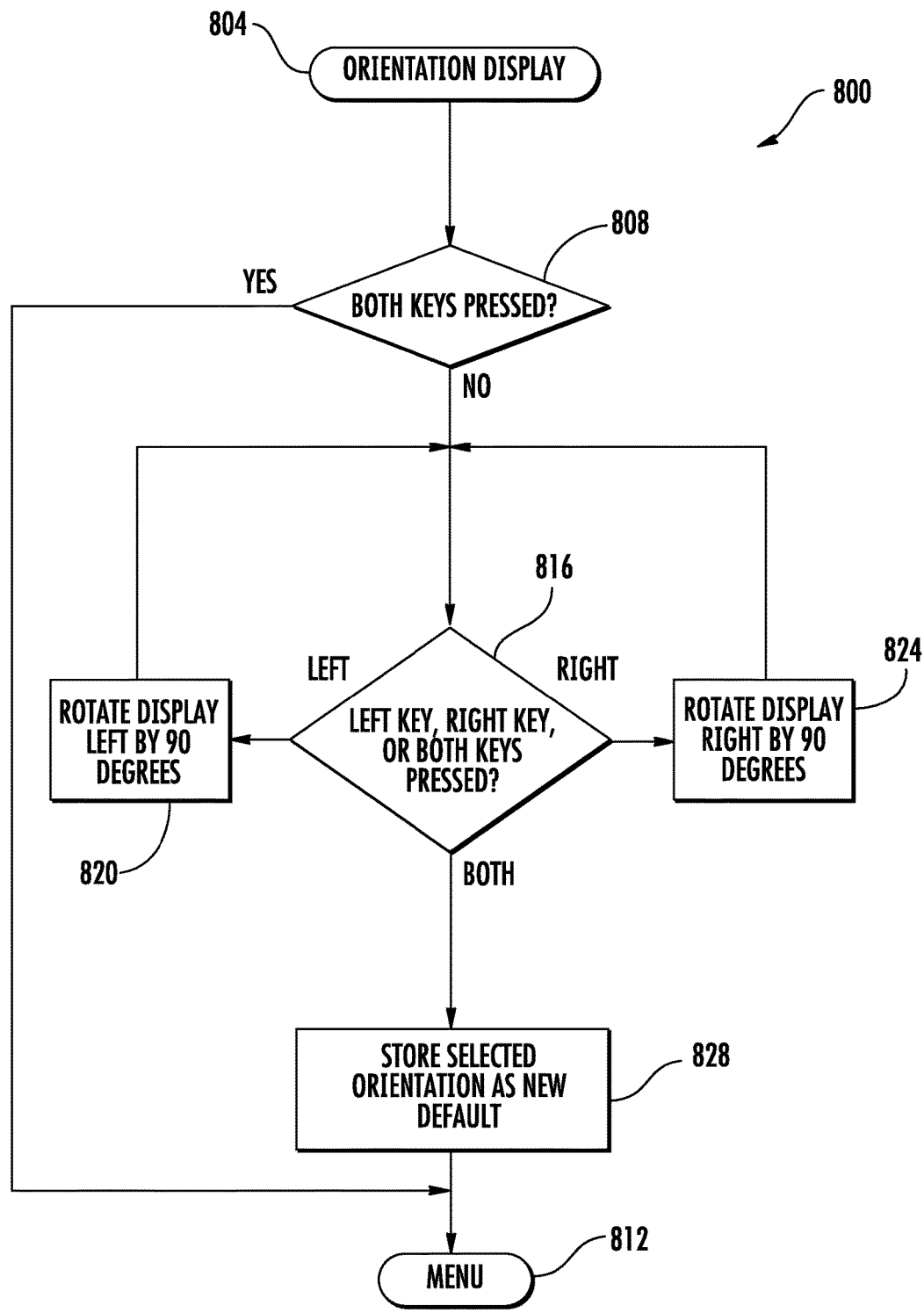
FIG. 6 is a flow diagram of an exemplary embodiment of an operational sequence for reorienting a message.

One embodiment of an operational sequence that may be performed by an HVAC control to reorient the display of messages on an alphanumeric display is indicated generally in FIG. 6 by reference number 800. The example sequence 800 allows a user to reorient the display by 90-degree increments. It should be noted, however, that embodiments are possible in which a display may be rotated in increments of more than and/or less than 90 degrees. The sequence 800 may be performed, e.g., in relation to dot matrix displays and/or segmented displays and will be described with reference to the control 700 of FIGS. 4-5.

In process 804 the control 700 displays an orientation display message, which may include characters, e.g., one or more arrows, carets, etc., to show the current orientation of the alphanumeric display 708. Generally an orientation display message may be displayed, e.g., at HVAC system power-up, although in various embodiments the sequence 800 could be invoked at other or additional times in response to user input and/or automatically. In the present example embodiment, input(s) 728 of the control 700 include two-position switches, e.g., two push buttons as described with reference to FIG. 1. A user may, e.g., provide input via the push buttons (referred to in the present example as "right key" and "left key") in response to the orientation display message. For example, if the user is satisfied with the current orientation of the alphanumeric display 708, the user may press the left and right keys at the same time to cause the control 700 to continue using the current orientation for the alphanumeric display 708. A user who instead wishes to reorient the alphanumeric display 708 may press a single one of the left and right keys to select a corresponding direction in which to rotate the display.

In process 808 the control 700 determines that one or both of the left and right keys have been pressed. If both keys have been pressed at substantially the same time, the control 700 transfers control to process 812 in which the control may display a menu, e.g., whereby the user may select other or additional features and/or functions available via the control 700. If it is determined that only one key was pressed, the control 700 causes the orientation of the display 708 to be rotated by 90 degrees in a selected direction. For example, if in process 816 the control 700 determines that the left key was pressed, then in process 820 the control 700 causes the orientation of the display 708 to be rotated counterclockwise by 90 degrees. Similarly, if the control 700 determines in process 816 that the right key was pressed, then in process 824 the control 700 causes the orientation of the display 708 to be rotated clockwise by 90 degrees. Control returns to process 816, whereby it is again determined whether the user has again pressed the left and/or right keys. When the user has finished entering single key press(es) for consecutive 90-degree rotations, the user may press the left and right keys together. If in process 816 the control 700 determines that the left and right keys were pressed at substantially the same time, the control 700 in process 828 stores, e.g., in the memory 740, the reorientation selected by the user as a new default orientation. In various embodiments the control 700 may also provide confirmatory feedback by redisplaying the orientation display message at the currently selected orientation(s). After a display default has been established, the control 700 transfers control to process 812, e.g., to display a menu from which features and/or functions of the control 700 may be selected. It should be noted that process 812 could be performed in ways alternative to, or in addition to, displaying a menu. The control 700 may cause messages to be displayed on the alphanumeric display 708 at the user-selected default orientation until, e.g., a user selects a different default orientation.

It should be noted that the reorientation sequence 800 is only one of many ways in which a control may provide for reorientation of a display. For example, a user typically may wish to apply a 180-degree rotation to reorient messages displayed, e.g., on seven-segment displays. Referring to FIG. 1, in one embodiment in which the display 108 is a seven-segment display, one or both keys (120a, 120b) could be used to perform the rotation. For example, in response to an orientation display message shown on the display 108, a user might press a single key (120a, 120b) once to select a 180-degree rotation, and then press both keys (120a, 120b) to conclude the reorientation. In another embodiment, a user may press a single key to select a reorientation and press a single key to conclude reorientation.

The foregoing capability can be beneficial for original equipment manufacturers (OEMs), field service technicians, and/or others who may find it difficult to read a display, e.g., that has been reoriented with replacement equipment. Status and fault displays are far more likely to be read and interpreted accurately when a user is given the flexibility to change the display to a more convenient orientation.

Exemplary embodiments disclosed herein may be used with an Integrated Furnace Control (IFC), an air handler control, a heat pump control, and/or a unitary control for heating and/or cooling appliances, among other possible controls or controllers for residential or commercial HVAC appliances and/or systems. Embodiments may be provided in relation to indoor and/or outdoor HVAC controls and/or in relation to indoor and/or outdoor HVAC control boards. Accordingly, aspects of the present disclosure should not be limited to use with any one particular type of control or controller. Embodiments are possible, e.g., in relation to substantially any control that uses a multiple-segment LED display or a dot matrix display provided, e.g., on a PCB of the control.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail. In addition, advantages and improvements that may be achieved with one or more exemplary embodiments of the present disclosure are provided for purpose of illustration only and do not limit the scope of the present disclosure, as exemplary embodiments disclosed herein may provide all or none of the above mentioned advantages and improvements and still fall within the scope of the present disclosure.

Specific dimensions, specific materials, and/or specific shapes disclosed herein are example in nature and do not limit the scope of the present disclosure. The disclosure herein of particular values and particular ranges of values for given parameters are not exclusive of other values and ranges of values that may be useful in one or more of the examples disclosed herein. Moreover, it is envisioned that any two particular values for a specific parameter stated herein may define the endpoints of a range of values that may be suitable for the given parameter (the disclosure of a first value and a second value for a given parameter can be interpreted as disclosing that any value between the first and second values could also be employed for the given parameter). Similarly, it is envisioned that disclosure of two or more ranges of values for a parameter (whether such ranges are nested, overlapping or distinct) subsume all possible combination of ranges for the value that might be claimed using endpoints of the disclosed ranges.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of controlling a heating, ventilation, and/or air conditioning (HVAC) appliance, the method comprising:
   a HVAC appliance control displaying, on an alphanumeric display of the HVAC appliance control, a plurality of menu options user-selectable therefrom for entering operational parameters whereby to configure the HVAC appliance control to control an HVAC appliance, the menu options further including an option user-selectable for rotating the displaying on the alphanumeric display;
   the HVAC appliance control receiving a user input indicating selection of the option for rotating the displaying;
   the HVAC appliance control determining a response to the user input; and
   the HVAC appliance control implementing the determined response by rotating the displaying from a first display orientation to a second display orientation.

2. The method of claim 1 further comprising displaying a message on the alphanumeric display in accordance with the changed orientation.

3. The method of claim 1, comprising:
   before displaying the plurality of menu options user-selectable therefrom for entering operational parameters whereby to configure the HVAC appliance control to control an HVAC appliance, displaying a message on the alphanumeric display to indicate a current message orientation relative to the alphanumeric display.

4. The method of claim 1, wherein the alphanumeric display includes one or more of the following: a multiple-segment display, three seven-segment light-emitting diode (LED) displays, and a dot matrix display.

5. The method of claim 1, wherein the HVAC appliance control includes one or more of the following: a furnace control, an air conditioning control, a heat pump control, an air handler control, an integrated control, and a unitary control.

6. The method of claim 1, wherein:
   a plurality of two-position switches of the control includes first and second keys for indicating directions in which to change message orientation, and
   the method comprises determining a display orientation angle based on one or more signals from the first key and/or second key.

7. A method of controlling a heating, ventilation, and/or air conditioning (HVAC) appliance, the method comprising:
   a HVAC appliance control displaying, on an alphanumeric display of the HVAC appliance control, a plurality of menu options user-selectable therefrom for entering operational parameters whereby to configure the HVAC appliance control to control an HVAC appliance, the menu options further including an option user-selectable for rotating the displaying of a message on the alphanumeric display;
   the HVAC appliance control receiving a user input indicating selection of the option for rotating the displaying;
   the HVAC appliance control determining a response to the user input; and
   the HVAC appliance control implementing the determined response by rotating the displaying from a first display orientation to a second display orientation.

8. The method of claim 7 further comprising displaying the message on the alphanumeric display in accordance with the changed orientation.

9. The method of claim 7, comprising:
   before displaying the plurality of menu options user-selectable therefrom for entering operational parameters whereby to configure the HVAC appliance control to control an HVAC appliance, displaying the message on the alphanumeric display to indicate a current message orientation relative to the alphanumeric display.

10. The method of claim 7, wherein the alphanumeric display includes one or more of the following: a multiple-segment display, three seven-segment light-emitting diode (LED) displays, and a dot matrix display.

11. The method of claim 7, wherein the HVAC appliance control includes one or more of the following: a furnace control, an air conditioning control, a heat pump control, an air handler control, an integrated control, and a unitary control.

12. The method of claim 7, wherein:
   a plurality of two-position switches of the appliance control includes first and second keys for indicating directions in which to change message orientation, and
   the method comprises determining a display orientation angle based on one or more signals from the first key and/or second key.

13. A method of controlling a heating, ventilation, and/or air conditioning (HVAC) appliance, the method comprising:
- a HVAC appliance control sequentially displaying, on an alphanumeric display of the HVAC appliance control, a plurality of menu options user-selectable therefrom for entering operational parameters whereby to configure the HVAC appliance control to control an HVAC appliance, the menu options further including an option user-selectable for rotating the displaying on the alphanumeric display;
- the HVAC appliance control receiving a user input indicating selection of the option for rotating the subsequent displaying;
- the HVAC appliance control determining a response to the user input; and
- the HVAC appliance control implementing the determined response by rotating the subsequent displaying from a first display orientation to a second display orientation.

14. The method of claim 13, wherein, after displaying one or more of the menu options user-selectable therefrom for entering operational parameters, the HVAC appliance control receives the user input indicating selection of the option for rotating the displaying.

* * * * *